J. A. ALLEN.
CULTIVATING IMPLEMENT.
APPLICATION FILED OCT. 21, 1920.
1,415,759.
Patented May 9, 1922.
2 SHEETS—SHEET 1.
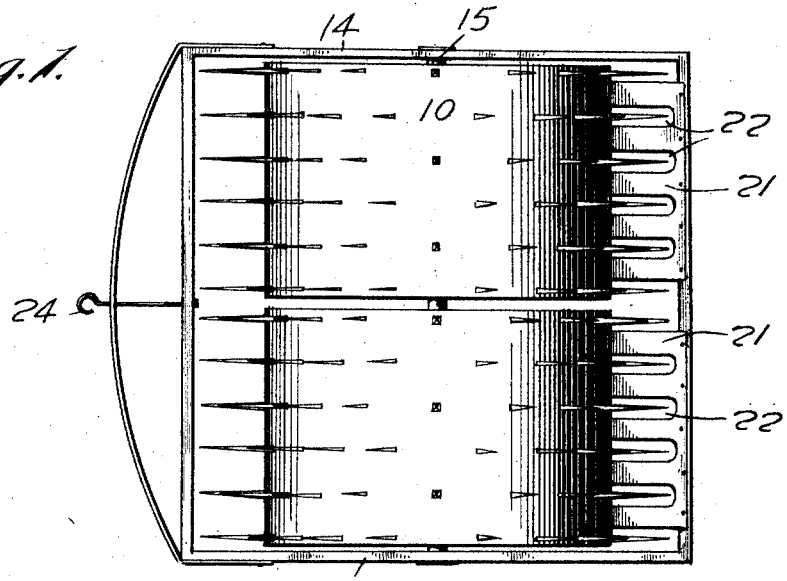
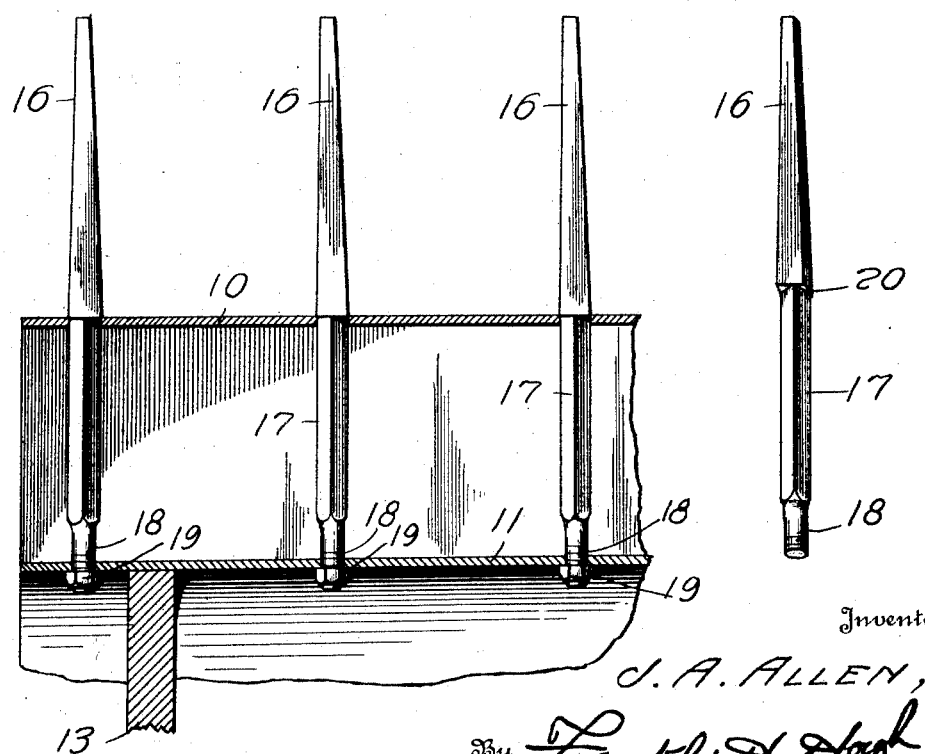
Inventor
J. A. ALLEN,
By Franklin H. Hough
Attorney

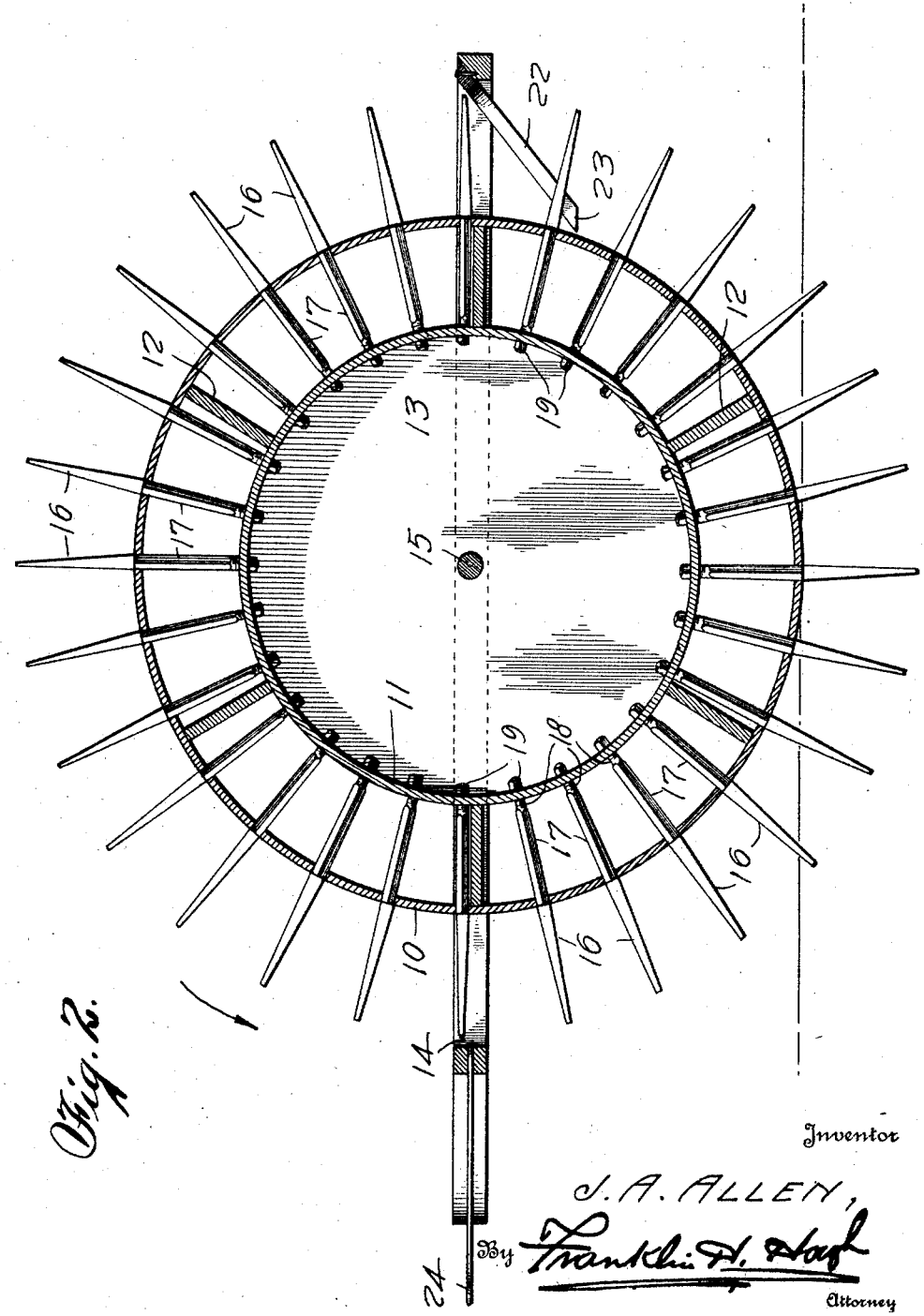

UNITED STATES PATENT OFFICE.

JAMES ALEXANDER ALLEN, OF CHOCCOLOCCO, ALABAMA.

CULTIVATING IMPLEMENT.

1,415,759.  Specification of Letters Patent.  Patented May 9, 1922.

Application filed October 21, 1920. Serial No. 418,386.

*To all whom it may concern:*

Be it known that I, JAMES A. ALLEN, a citizen of the United States, residing at Choccolocco, in the county of Calhoun and State of Alabama, have invented certain new and useful Improvements in Cultivating Implements, of which the following is a specification, reference being had therein to the accompanying drawings.

This invention relates to cultivating implements, and has for an object to provide a device of the class having new and improved features of efficiency, economy and operativeness.

A further object of the invention is to provide a cultivator of the cylinder and tooth type with improved means for securing the teeth into and upon the cylinder.

A further object of the invention is to provide a device of the class with improved means for stripping the teeth.

With these and other objects in view the device comprises certain novel units, elements, parts, features, functions and combinations as will be hereinafter more fully described and claimed.

In the drawings:

Figure 1 is a top plan view of the implement;

Figure 2 is a vertical sectional view through the implement;

Figure 3 is a detail view showing the manner of attaching the teeth, and

Figure 4 is a detail perspective view of one of the teeth.

Like characters of reference indicate corresponding parts throughout the several views.

The improved cultivating implement which forms the subject matter of this application comprises spaced concentric cylinders 10 and 11, the spacing being accomplished in any usual and well-known manner, as by the employment of the spacer strips 12.

For the purpose of excluding dirt and other extraneous matter, the ends of the inner cylinder 11 are closed by means of heads 13, which also serve to journal the device upon the frame 14, by the axis 15.

The two cylinders 10 and 11 are perforated, and when assembled, the perforations register, such perforations being in any number found convenient, or necessary to the proper functioning of the apparatus.

The teeth comprise the earth penetrating section 16 (see Fig. 4) and the shank section 17, the latter being provided with a threaded tang 18 which is inserted through the inner cylinder 11 and a nut 19 applied thereto within such cylinder. Between the sections 16 and 17 shoulders 20 are provided which bear against the external periphery of the cylinder 10.

The teeth are of pyramidal form and are fixed relative to the cylinder with the face of the cylinder alined with the axis of the cylinder whereby the earth is torn rather than cut. They are held fixedly in this relation by having the shank of polygonal form fitting the perforations in the outer cylinder, and by having the faces of the shank at an angle to the faces of the pyramid, the shoulder 20 is provided without varying the thickness of the tooth at the shoulder and the faces of the pyramid are co-planar with the edges of the shank.

Teeth of the construction just described in sufficient number to fill the perforations of the cylinders, are applied in the manner referred to, forming a series of pointed members extending beyond the exterior of the outer cylinder 10.

The frame 14 carries a stripper, which consists of a plate, or plates, 21 having openings 22, through which the teeth pass, said structure being set at an inclination to the frame, as indicated more particularly at Figure 2, and beveled at the end adjacent the cylinder, as indicated at 23, also in said figure.

A draft mechanism is applied to the frame, here shown conventionally as the hook 24, it being understood, however, that the invention is in no way limited to the specific draft applying structure, and any usual and ordinary structure may be substituted therefor.

With draft applied as to the hook 24, the device is moved over the ground in such manner that the cylinders rotate in the direction indicated by the arrow, and as the teeth pass through the stripper, any leaves, sticks, or other extraneous matter adhering thereto, or impaled thereon, will be stripped therefrom and dropped from the rear of the machine.

It is believed that the operation of the device will be fully understood from the description entered into at some length in the description of the structure, and that further description of such operation will not be necessary.

What I claim to be new is:

In a cultivator, a pair of concentric cylinders carrying radially projecting teeth, the teeth of pyramidal form and fixed with a face of the pyramid alined with the axis of the cylinders, the fixing means including a polygonal shank to the teeth with the faces of the polygon at an angle to the faces of the pyramid, the shank fitting a perforation in the outer cylinder and secured to the inner cylinder.

In testimony whereof I hereunto affix my signature in presence of two witnesses.

JAMES ALEXANDER ALLEN.

Witnesses:
A. H. LITTLE,
J. H. WHITE.